(12) United States Patent
Lawenius et al.

(10) Patent No.: US 12,377,504 B2
(45) Date of Patent: Aug. 5, 2025

(54) PROTECTION ARRANGEMENT FOR A POWER TOOL

(71) Applicant: HUSQVARNA AB, Huskvarna (SE)

(72) Inventors: Mats Lawenius, Gothenburg (SE); Anders Reuterberg, Lerum (SE); Niklas Sundberg, Alingsås (SE)

(73) Assignee: HUSQVARNA AB, Huskvarna (SE)

( * ) Notice: Subject to any disclaimer, the term of this patent is extended or adjusted under 35 U.S.C. 154(b) by 327 days.

(21) Appl. No.: 17/124,049

(22) Filed: Dec. 16, 2020

(65) Prior Publication Data

US 2021/0101239 A1  Apr. 8, 2021

Related U.S. Application Data

(63) Continuation of application No. 17/251,966, filed as application No. PCT/SE2018/050721 on Jul. 2, 2018.

(51) Int. Cl.
   *B23D 45/16* (2006.01)
   *B23Q 11/08* (2006.01)
   *B28D 1/04* (2006.01)

(52) U.S. Cl.
   CPC .............. *B23Q 11/08* (2013.01); *B23D 45/16* (2013.01); *B28D 1/04* (2013.01)

(58) Field of Classification Search
   CPC .. B28D 1/04; B28D 7/02; B23D 45/16; B24B 55/05; B24B 55/052; B23Q 11/06; B23Q 11/08; B27G 19/04

(Continued)

(56) References Cited

U.S. PATENT DOCUMENTS

1,711,490 A  5/1929  Drummond
1,738,896 A  12/1929  Hansen
(Continued)

FOREIGN PATENT DOCUMENTS

CN  2822845 Y  10/2006
CN  103128640 A  6/2013
(Continued)

OTHER PUBLICATIONS

International Search Report and Written Opinion for International Application No. PCT/SE2018/050721 mailed Apr. 3, 2019.
(Continued)

*Primary Examiner* — Ghassem Alie
*Assistant Examiner* — Samuel A Davies
(74) *Attorney, Agent, or Firm* — Burr & Forman LLP

(57) ABSTRACT

A hand-held power tool may include a rotatable work tool with a center, a circumference and a direction of rotation. The power tool may further include a blade guard arrangement arranged to shield a variable part of the rotatable work tool which may include a blade guard and a swiveling cover part attached to the blade guard. In a first position, the swiveling cover part may be positioned such that a first portion of the circumference is covered, following the blade guard, and extending an angular distance after the blade guard, in the direction of rotation. The swiveling cover part may be moveable between the first position and a second position where a cutting operation of the rotatable work tool along the first portion of the circumference occurs. The cover part may be biased towards the first position.

16 Claims, 11 Drawing Sheets

(58) Field of Classification Search
USPC .......................................................... 30/391
See application file for complete search history.

(56) References Cited

U.S. PATENT DOCUMENTS

| | | | |
|---|---|---|---|
| 2,384,243 A | | 9/1945 | Andrew et al. |
| 2,669,264 A | * | 2/1954 | Wilson .................. B27G 19/02 |
| | | | 144/251.1 |
| 2,722,246 A | * | 11/1955 | Arnoldy ................. B27G 19/04 |
| | | | 144/251.1 |
| 2,926,709 A | * | 3/1960 | Kaley .................... B27G 19/02 |
| | | | 83/486.1 |
| 3,382,578 A | * | 5/1968 | Dobbertin ............... B24B 55/05 |
| | | | 451/451 |
| 3,438,410 A | | 4/1969 | Santilli |
| 3,730,239 A | | 5/1973 | Kaman et al. |
| 3,781,988 A | * | 1/1974 | Jones ..................... B26B 29/02 |
| | | | 30/2 |
| 3,802,080 A | * | 4/1974 | Peter ...................... A22B 5/206 |
| | | | 30/292 |
| 3,805,636 A | | 4/1974 | Howes |
| 3,805,639 A | | 4/1974 | Peter |
| 4,316,328 A | | 2/1982 | Duggan et al. |
| 4,646,607 A | | 3/1987 | Johansson |
| 4,972,589 A | * | 11/1990 | Povleski ............ B23D 57/0076 |
| | | | 30/388 |
| 5,012,582 A | | 5/1991 | Bristol et al. |
| 5,075,976 A | | 12/1991 | Young |
| 5,146,825 A | * | 9/1992 | Dehari ................... B27G 19/02 |
| | | | 83/486.1 |
| 5,167,215 A | | 12/1992 | Harding, Jr. |
| 5,171,112 A | | 12/1992 | Roland |
| 5,203,245 A | | 4/1993 | Terpstra |
| 5,752,421 A | | 5/1998 | Chang |
| 5,784,789 A | | 7/1998 | Vargas |
| 5,890,292 A | * | 4/1999 | Stark ..................... B23D 45/16 |
| | | | 83/478 |
| 5,937,720 A | | 8/1999 | Itzov |
| 5,974,674 A | * | 11/1999 | Kelly ..................... B27F 5/023 |
| | | | 144/136.95 |
| 6,182,548 B1 | | 2/2001 | Meredith et al. |
| 6,336,273 B1 | * | 1/2002 | Nilsson .................. B24B 27/08 |
| | | | 30/389 |
| 6,471,574 B1 | | 10/2002 | Rupprecht et al. |
| 6,546,631 B2 | | 4/2003 | Iida et al. |
| 6,551,038 B1 | * | 4/2003 | Sugata ................. B23Q 11/085 |
| | | | 29/DIG. 56 |
| 6,893,334 B1 | | 5/2005 | Stivers |
| 7,261,624 B2 | | 8/2007 | Wedel et al. |
| 7,891,101 B2 | | 2/2011 | Brady |
| 8,371,034 B2 | * | 2/2013 | Nishikawa ............... B28D 7/02 |
| | | | 30/516 |
| 9,751,202 B2 | | 9/2017 | Frazer |
| 2002/0157265 A1 | | 10/2002 | Haneda et al. |
| 2007/0130782 A1 | | 6/2007 | Barton |
| 2007/0261254 A1 | * | 11/2007 | Donnerdal ............... B27B 5/14 |
| | | | 30/389 |
| 2008/0168667 A1 | | 7/2008 | Spinato |
| 2009/0007435 A1 | * | 1/2009 | Droste ................... B23D 45/16 |
| | | | 30/388 |
| 2009/0013541 A1 | * | 1/2009 | Amend .................... B28D 7/02 |
| | | | 30/286 |
| 2009/0071017 A1 | | 3/2009 | Gehret |
| 2009/0088052 A1 | * | 4/2009 | Whelan ................... B24B 27/08 |
| | | | 29/592 |
| 2009/0133559 A1 | | 5/2009 | Sargeant et al. |
| 2010/0275450 A1 | | 11/2010 | Refson |
| 2010/0275755 A1 | | 11/2010 | Cox |
| 2011/0099819 A1 | * | 5/2011 | Orlowski ............... B27G 19/04 |
| | | | 30/391 |
| 2012/0276823 A1 | | 11/2012 | Murakami |
| 2013/0047443 A1 | | 2/2013 | Brown et al. |
| 2013/0081370 A1 | * | 4/2013 | Koester ................... A01D 34/84 |
| | | | 56/255 |
| 2013/0283622 A1 | * | 10/2013 | Eto ........................ B26B 25/002 |
| | | | 30/164 |
| 2014/0223748 A1 | | 8/2014 | Guth |
| 2016/0297051 A1 | | 10/2016 | Aiken et al. |
| 2016/0297052 A1 | | 10/2016 | Aiken et al. |
| 2018/0281086 A1 | * | 10/2018 | Greitmann .............. B25F 5/021 |
| 2018/0345444 A1 | | 12/2018 | Greitmann et al. |

FOREIGN PATENT DOCUMENTS

| | | |
|---|---|---|
| CN | 207415711 U | 5/2018 |
| EP | 2163363 A2 | 3/2010 |
| EP | 1772222 A1 | 11/2010 |
| EP | 2965865 A2 | 1/2016 |
| JP | H07276302 A | 10/1995 |
| JP | 3036647 U | 5/1997 |
| JP | 2007038645 A | 2/2007 |
| JP | 2013244578 A | 12/2013 |
| WO | 9843794 A1 | 10/1998 |
| WO | 2016/137379 A1 | 9/2016 |
| WO | 2018001385 A1 | 1/2018 |
| WO | 2018062293 A1 | 4/2018 |

OTHER PUBLICATIONS

Swedish Office Action and Search Report for Swedish Application No. 1850836-6, Mailed on Jan. 25, 2019.

* cited by examiner

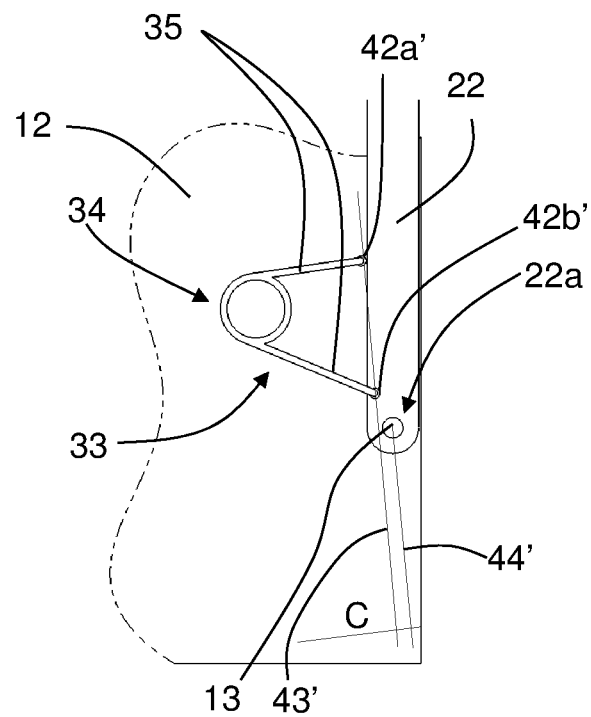
FIG. 16
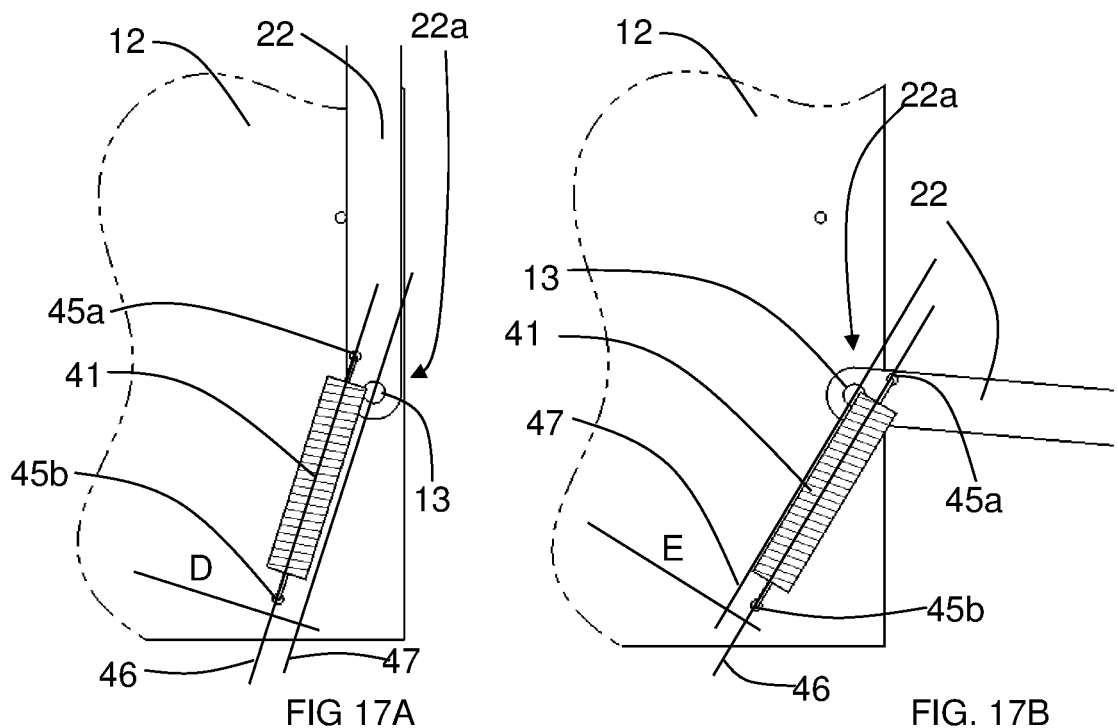
FIG 17A
FIG. 17B

PROTECTION ARRANGEMENT FOR A POWER TOOL

TECHNICAL FIELD

The present disclosure relates to a hand-held power tool comprising a rotatable work tool with a center and a circumference, and being adapted to rotate in a direction of rotation. The power tool further comprises a blade guard arrangement that is arranged to shield a variable part of the rotatable work tool.

BACKGROUND

Many power tools such as power cutters have saw blades in the form of cutting discs which may be circular or ring-shaped. Such a cutting machine may be used for cutting hard materials such as concrete or rock, where the cutting disc is partially covered by a blade guard.

On rare occasions, a so-called kick-back can occur, where the cutting disc moves both upwards and backwards, towards the user, where the force that causes this movement originates from a locking contact between the cutting disc and a working object in combination with the energy that is stored in the cutting disc's inertia. Such a kick-back can cause injury to a user since the thin and probably rotating cutting disc can hit the user.

U.S. Pat. No. 8,413,340 discloses a safety guard assembly for a handheld power saw with a saw blade where, in a kick-back situation, a weight at the safety guard enhances a moment of inertia such that the safety guard is released from a spring-biased locking mechanism. The safety guard consists of two parts that move on opposite sides of the saw blade, away from a central part of the saw blade towards the periphery of the saw blade, by pivoting around a pivot pin. However, the cutting edge of the saw blade will not be covered by the safety guard due to its construction of two parts that move on opposite sides of the saw blade.

There is thus a desire for a more reliable protection arrangement for an engine-driven cutting machine that allows a more flexible use of the engine-driven cutting machine.

SUMMARY

An object of the present disclosure is to provide a hand-held power cutter comprising a rotatable work tool, where the power tool is adapted for a more flexible use by means of an enhanced protection arrangement. Another object is to provide an improved blade guard arrangement.

This object is achieved by means of a hand-held power tool comprising a rotatable work tool with a center and a circumference and being adapted to rotate in a certain direction of rotation. The power tool further comprises a blade guard arrangement that is arranged to shield a variable part of the rotatable work tool and comprises a blade guard and a swiveling cover part that is attached to the blade guard by means of at least one holding means comprised in the blade guard arrangement. In a first position, the swiveling cover part is positioned such that a first arc of a circle is covered, where the first arc of a circle follows the blade guard and runs an angular distance along the circumference after the blade guard, in the direction of rotation. The cover part is moveable between the first position and a second position where a cutting operation of the rotatable work tool along the first arc of a circle is allowed. The cover part is biased in the direction of rotation, towards the first position by means of a biasing member.

This provides user protection along that part first arc of a circle that is not comprised I a work object in, which is an advantage. This is advantageous in the case of a kick-back condition. This also enables a more flexible use by means of an enhanced protection arrangement.

According to some aspects, a second arc of a circle is adjacent to the first arc of a circle and runs an angular distance along the circumference after the first arc of a circle in the direction of rotation. The second arc of a circle is uncovered in the first position such that initial cutting is allowed along the second arc of a circle.

This stimulates a user to start cutting along the second arc of a circle, which provides a safe and preferred initial cutting, which is an advantage.

According to some aspects, the blade guard arrangement comprises a continuously running delimiting contact part against which a work object at least partly can rest during cutting of the work object. During cutting, the cover part can move between the first position and the second position by means of pressure from the work object against said contact part, the pressure working against the biasing. The contact part is either comprised in the cover part or comprised in a part connecting the cover part to the blade guard.

This provides a safe support for the work object that can move the cover part during cutting in a reliable manner.

According to some aspects, each holding means is pivotably attached to the swiveling cover part and the blade guard at its respective ends, and adapted to move relative the blade guard when the cover part is moved between the first position and the second position.

According to some aspects, there are two holding means at the same side of the blade guard arrangement, where the holding means lie in a common plane parallel to a planar extension of the rotatable work tool.

According to some aspects, there are two holding means at the same side of the blade guard arrangement, where the holding means lie in different planes parallel to a planar extension of the rotatable work tool.

This enables the cover part move along the blade guard without any holding means having to be attached at the center. Furthermore, the holding means move during work, preventing them from becoming stiff or stuck, for example due to accumulated dust and dirt.

According to some aspects, the cover part is attached to the blade guard by means of at least one holding means comprised in the blade guard arrangement. Each holding means is in the form of a guide attached to the blade guard and is adapted to run in a corresponding arcuate slot in the cover part.

This provides an uncomplicated connection between the cover part and the blade guard.

According to some aspects, the cover part is attached to the blade guard by means of at least one holding means comprised in the blade guard arrangement. Each holding means is in the form of a pivot pin attached to the blade guard where the cover part is adapted to pivot around the pivot pin.

This provides an uncomplicated connection between the cover part and the blade guard.

According to some aspects, the cover part is connected to the blade guard such that it is moveable along a path between the first position and the second position, where the path mainly follows the circumference such that a part of the blade guard is radially positioned between the circumference and the cover part in the second position.

In this manner, the cover part adjusts to the present work procedure in a discrete manner, enabling versatile work.

According to some aspects, the swiveling cover part is spring-biased towards the first position along at least a part of the path, the spring bias being accomplished by means of at least one spring element that constitutes said biasing means.

According to some aspects, each spring element is attached to the blade guard and a corresponding holding means end, and the holding means end is attached to the blade guard by means of a pivot pin. The spring element is biased such that the cover part strives towards the first position along at least a part of the path.

In the manner, the bias is accomplished in a reliable and uncomplicated manner.

According to some aspects, the spring element has a winding part and two arm parts which are attached to the blade guard and the corresponding holding means end at corresponding arm attachments. A first line passing the arm attachments never passes a second line, where the second line is parallel to the first line and runs via the pivot pin, such that the cover part is spring-biased towards the first position along the path.

In this manner, a reliable and unidirectional spring bias is obtained.

According to some aspects, the spring element has a winding part and two arm parts which are attached to the blade guard and the corresponding holding means end at corresponding arm attachments. A first line passing the arm attachments passes a second line when brought to the second position, where the second line is parallel to the first line and runs via the pivot pin, such that the cover part is spring-biased towards the second position along a part of the path.

In this manner, a reliable and bidirectional spring bias is obtained, enabling the cover part to be positioned at both the first positon and the second position.

According to some aspects, the winding part is adapted to move when the cover part is moved between the first position and the second position such that the force needed to move the cover part is reduced from the first position to the second position.

This provides a smooth movement from the first position to the second position.

According to some aspects, the spring element comprises a spiral spring that is attached to the blade guard and the corresponding holding means end at corresponding spring attachments. A first line passing the spring attachments passes a second line when brought to the second position. The second line is parallel to the first line and runs via the pivot pin, such that the cover part is spring-biased towards the second position along a part of the path.

In this manner, a reliable and bidirectional spring bias is obtained, enabling the cover part to be positioned at both the first positon and the second position.

According to some aspects, the cover part comprises a handle that admits a user to move the cover part between the first position and the second position.

This enables a user to easily access the part of the rotatable work tool where it otherwise is covered by the cover part.

According to some aspects, the blade guard comprises a lock part that is adapted for releasably locking the cover part in the second position.

This enables a user to easily have access the part of the rotatable work tool where it otherwise is covered by the cover part.

According to some aspects, the blade guard is adapted to rotate in the direction of rotation, where the rotation is caused by the mass of the blade guard in combination with an acceleration.

This provides further protection for a user.

According to some aspects, the blade guard comprises a weight.

This provides a stable and quick movement.

According to some aspects, the cover part comprises a wheel that is adapted to be in rotatable contact with a work object during cutting.

This provides easy cutting, when the cover part is moved by means of the work object.

According to some aspects, the cover part at least partly is made as a see-through structure.

This enables a user to always have less impaired visual control of the cutting irrespective of the cover part's position.

This object is also achieved by means of a hand-held power tool comprising a rotatable work tool having a center and a circumference and that is adapted to rotate in a certain direction of rotation. The power tool further comprises a blade guard arrangement that at least partly is arranged to shield a part of the rotatable work tool and comprises a blade guard and a protective arrangement that is adapted to be displaced from a working position, where the protective arrangement admits normal cutting of a work object, to a displaced position. In the displaced position, the protective arrangement at least partly becomes positioned such that a first arc of a circle is covered, where the first arc of a circle follows the blade guard, and runs an angular distance along the circumference after the blade guard, in the direction of rotation.

This enables user protection along that part first arc of a circle, which is an advantage. This is advantageous in the case of a kick-back condition. This also enables a more flexible use by means of an enhanced protection arrangement.

According to some aspects, the displacement is caused by the mass of the protective arrangement in combination with an acceleration.

This can be advantageous in the case of a kick-back condition.

According to some aspects, the blade guard comprises a protective part that constitutes the protective arrangement, where the blade guard is adapted to rotate around the center in the direction of rotation.

This provides an uncomplicated and reliable blade guard arrangement.

According to some aspects, the protective part comprises a weight.

This provides a stable and quick movement.

According to some aspects, the protective arrangement mostly covers a part of the blade guard in the working position and is adapted to be displaced to the displaced position along a path mostly following the direction of rotation.

This provides an uncomplicated and reliable blade guard arrangement.

According to some aspects, the protective arrangement a swiveling cover part that is attached to the blade guard by means of at least one holding means comprised in the blade guard arrangement. At its respective ends, each holding means is pivotably attached to the swiveling cover part and the blade guard, and is adapted to move relative the blade guard when the cover part is moved between the first position and the second position.

According to some aspects, there are two holding means at the same side of the blade guard arrangement, where the holding means lie in a common plane parallel to a planar extension of the rotatable work tool.

According to some aspects, there are two holding means at the same side of the blade guard arrangement, where the holding means lie in different planes parallel to a planar extension of the rotatable work tool.

This enables the holding means move during work, preventing them from becoming stiff or stuck, for example due to accumulated dust and dirt. This also enables the cover part move along the blade guard without any holding means having to be attached at the center.

According to some aspects, the cover part is attached to the blade guard by means of at least one holding means comprised in the blade guard arrangement. Each holding means is in the form of a guide attached to the blade guard and is adapted to run in a corresponding arcuate slot in the cover part.

This provides an uncomplicated connection between the cover part and the blade guard.

According to some aspects, the cover part is attached to the blade guard by means of at least one holding means comprised in the blade guard arrangement. Each holding means is in the form of a pivot pin attached to the blade guard where the cover part is adapted to pivot around the pivot pin.

This provides an uncomplicated connection between the cover part and the blade guard.

According to some aspects, the cover part is connected to the blade guard such that it is moveable along a path between the first position and the second position, where the path mainly follows the circumference such that a part of the blade guard is radially positioned between the circumference and the cover part in the second position.

In this manner, the cover part adjusts to the present work procedure in a discrete manner, enabling versatile work.

According to some aspects, the swiveling cover part is spring-biased by means of at least one spring element, where each spring element is attached to the blade guard and a corresponding holding means end. The holding means end is attached to the blade guard by means of a pivot pin and the spring element is biased such that the cover part strives towards the working position along a part of the path and towards the displaced position along the rest of the path.

According to some aspects, the spring element has a winding part and two arm parts which are attached to the blade guard and the corresponding holding means end at corresponding arm attachments. A first line passing the arm attachments passes a second line when brought to the working position, where the second line is parallel to the first line and runs via the pivot pin.

In this manner, a reliable and bidirectional spring bias is obtained, enabling the cover part to be positioned at both the first positon and the second position.

According to some aspects, the winding part is adapted to move when the cover part is moved between the working position and the displaced position such that the force needed to move the cover part is reduced from the working position to the displaced position.

This provides a smooth movement from the first position to the second position.

According to some aspects, the spring element comprises a spiral spring that is attached to the blade guard and the corresponding holding means end at corresponding spring attachments. A first line passing the spring attachments passes a second line when brought to the displaced position, where the second line is parallel to the first line and runs via the pivot pin.

In this manner, a reliable and bidirectional spring bias is obtained, enabling the cover part to be positioned at both the first positon and the second position.

According to some aspects, the protective arrangement comprises an airbag that is adapted to be inflated and expand to the displaced position.

According to some aspects, the airbag is adapted expand from the blade guard and to partly be positioned between the circumference and the blade guard after inflation, such that the movement of the rotatable work tool is reduced.

This enables a reduction of the rotational speed of the rotatable work tool.

This object is also achieved by means of blade guard arrangements that are associated with the above advantages.

BRIEF DESCRIPTION OF THE DRAWINGS

The present disclosure will now be described more in detail with reference to the appended drawings, where:

FIG. 16 shows a side view of a first type of spring element;

FIG. 17A shows a side view of a second type of spring element in one position;

FIG. 17B shows a side view of the spring element in another position;

DETAILED DESCRIPTION

Figure 1:
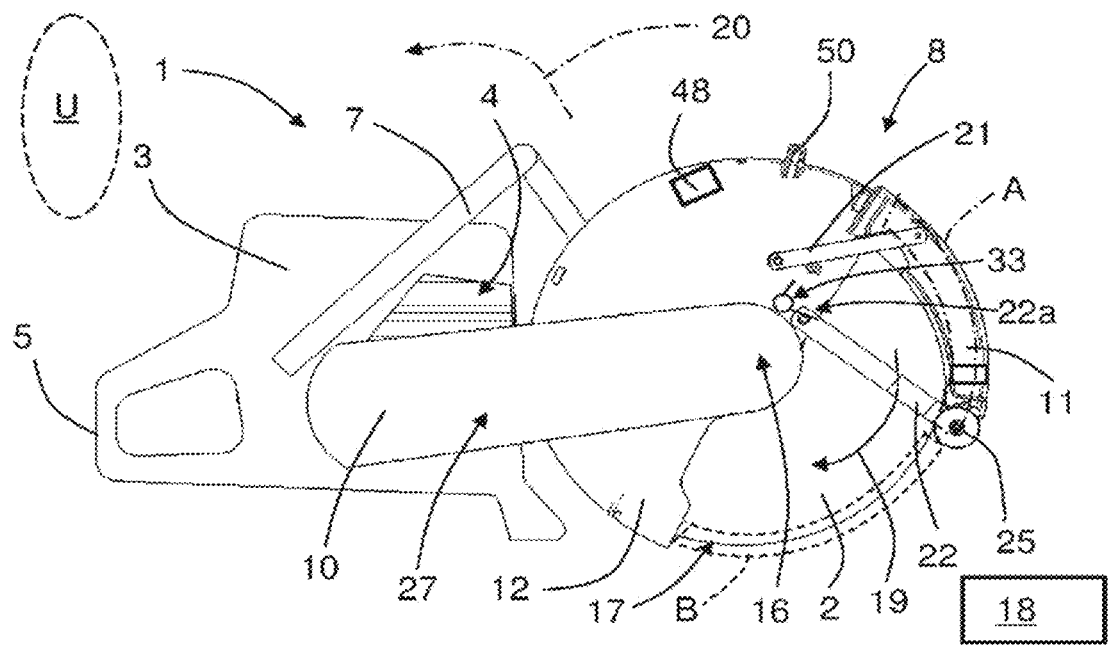
FIG. 1 shows a side view of a hand-held power cutter with a protective arrangement according to a first example in a first position.
Figure 2:
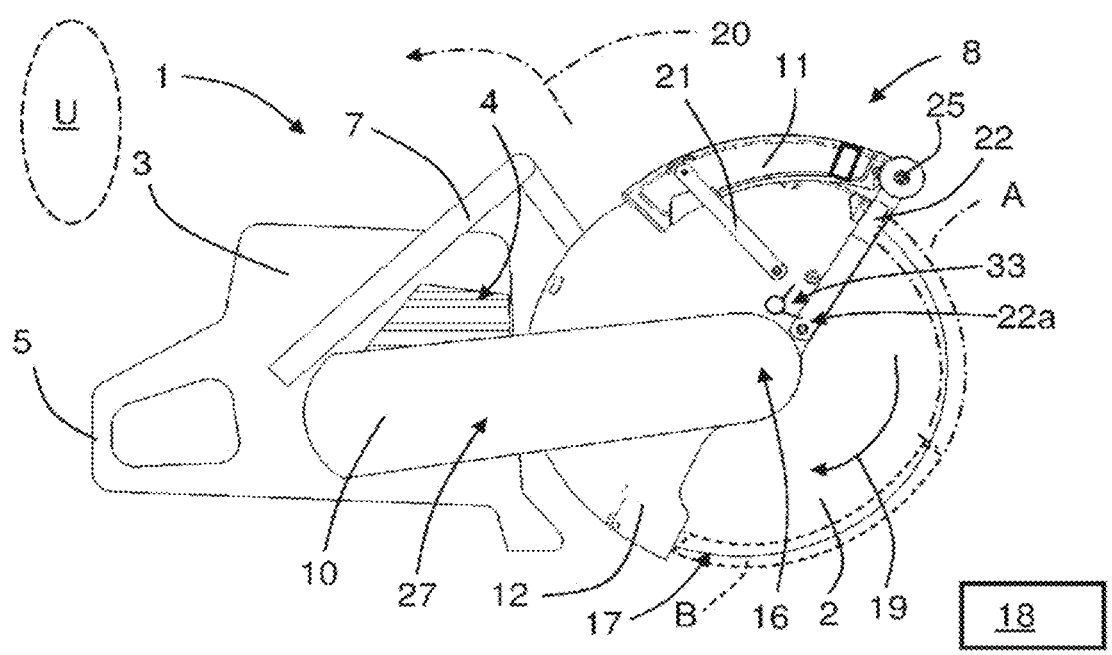
FIG. 2 shows a side view of a hand-held power cutter with a protective arrangement according to the first example in a second position.

FIG. 1 and FIG. 2 shows respective side views of a hand-held power cutter 1 according to a first example with a circularly shaped saw blade, constituting a cutting disc 2, for example suitable to cut through concrete. The cutting disc 2 has a center 16 and a circumference 17 (only schematically indicated). The power cutter 1 comprises a casing 3 at least partly enclosing a combustion engine 4, where the casing 3 in turn comprises a first handle part 5. The power cutter 1 further comprises a second handle part 7 that runs in an arcuate shape over the casing 3, the second handle part 7 being attached to the casing 3.

The power cutter 1 comprises a blade guard 8 that is arranged to shield a part of the cutting disc 2. The cutting disc 2 is adapted to rotate in a direction of rotation 19 and is connected to the engine 4 via a power transferring unit 27 that comprises a power transferring means (not shown) that is covered by a power transfer cover 10. The power transferring means is according to some aspects either in the form of an endless drive belt or a geared transmission that in turn is arranged to propel the cutting disc 2. As shown in the Figures, the direction of rotation 19 runs clockwise in a side view where the cutting disc 2 is positioned at the right of the engine 4.

The power cutter 1 further comprises a blade guard arrangement 8 that is arranged to shield a variable part of the cutting disc 2, where the blade guard arrangement 8 comprises a blade guard 12.

According to the present disclosure, the blade guard arrangement 8 further comprises a swiveling cover part 11 that is attached to the blade guard 12. In a first position, as illustrated in FIG. 1, the cover part 11 is positioned such that a first arc A of a circle is covered, where the first arc A of a circle is adjacent to the blade guard 12 and runs an angular distance along the circumference 17 after the blade guard 12 in the direction of rotation 19. The cover part 11 is arranged moveable between the first position and a second position, as illustrated in FIG. 2, where a cutting operation of the cutting disc 2 along the first arc A of a circle is allowed, where the cover part 11 is biased in the direction of rotation 19, towards the first position. When the cover part 11 is covering the first arc A of a circle in the first position, the circumference 17 is covered, and a user U is protected from the edge of the circumference 17 where it is covered by the cover part 11.

The first arc A of a circle at least follows the blade guard 12 and runs an angular distance along the circumference 17 after the blade guard 12 in the direction of rotation 19, allowing a gap to be present between the cover part 11 and the blade guard 12, at which gap a part of the cutting disc 2 can be visible. According to some aspects, there is no such gap.

In the first position, the circumference 17 along the first arc A of a circle is covered, which is advantageous in the case of a kick-back condition.

Furthermore, there is a second arc B of a circle that is adjacent to the first arc A of a circle and runs an angular distance along the circumference 17 after the first arc A of a circle in the direction of rotation 19. The second arc B of a circle is uncovered in the first position such that initial cutting is allowed along the second arc B of a circle. In this manner, a user U is stimulated to start cutting along the second arc B of a circle, which provides a safe and preferred initial cutting.

The arcs A, B of a circle, according to some aspects, have the same or similar radial extension as the circumference 17.

Figure 3:
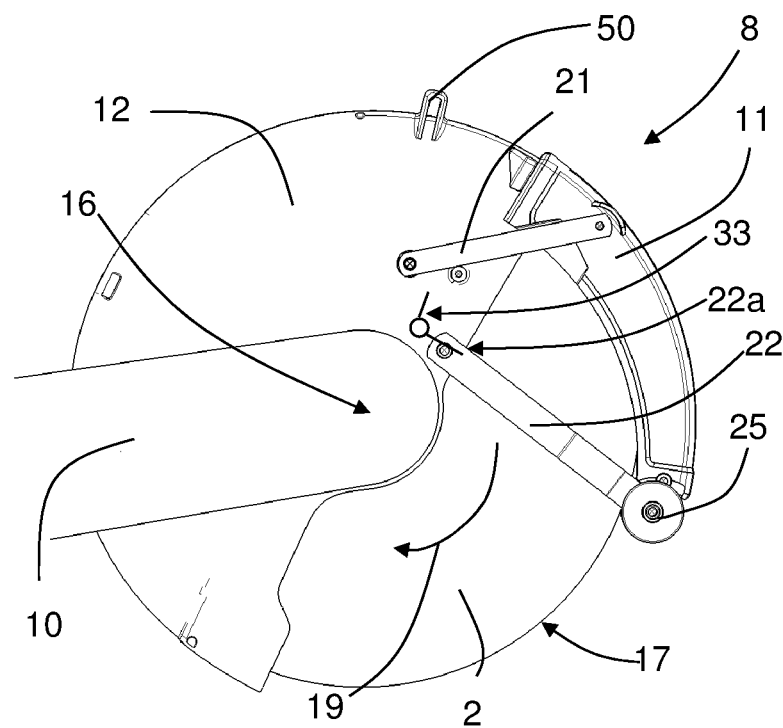
FIG. 3 shows a side view of a cutting disc and a blade guard arrangement with a protective arrangement according to the first example in the first position.
Figure 4:
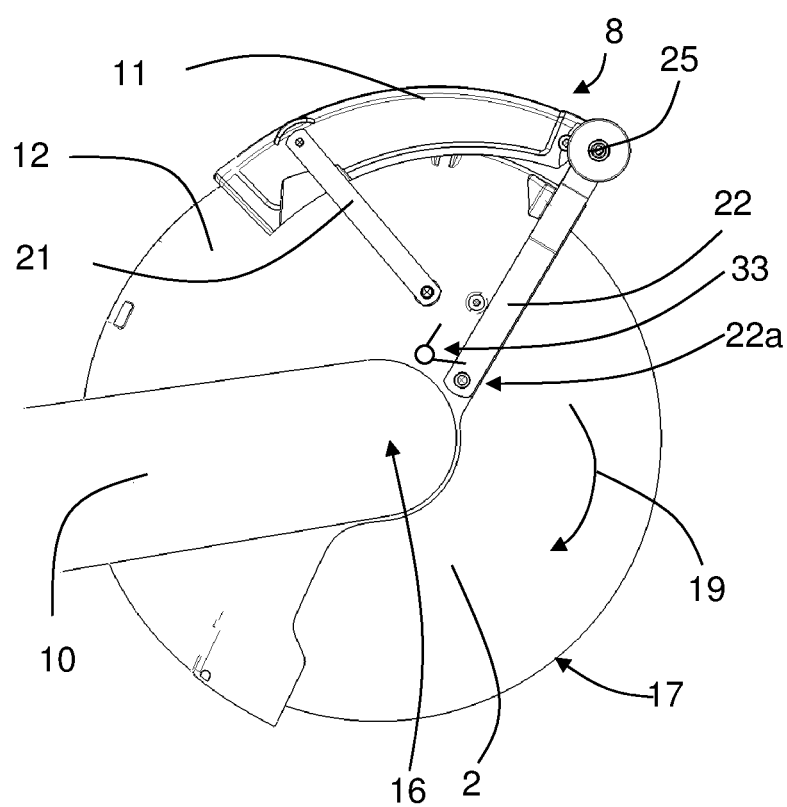
FIG. 4 shows a side view of a cutting disc and a blade guard arrangement with a protective arrangement according to the first example in the second position.

In the following, reference is also made to FIG. 3, showing a side view of the cutting disc 2 and the cover part 11 in the first position, and FIG. 4, showing a side view of the cutting disc 2 and the cover part 11 in the second position. The cover part 11 is attached to the blade guard 12 by means of holding rods comprised in the blade guard arrangement 8; a first holding rod 21 and a second holding rod 22. Each holding rod 21, 22 is pivotably attached to the swiveling cover part 11 and the blade guard 12 at its respective ends, and is adapted to move relative the blade guard 12 when the cover part 11 is moved between the first position and the second position. In this manner, the pivoting functionality is maintained by being used every time the power cutter 1 is used, preventing dirt from obscuring the pivoting functionality.

According to some aspects, there are two holding rods 21, 22 at the same side of the blade guard arrangement 8, where the holding rods 21, 22 lie in a common plane parallel to a planar extension of the cutting disc 2. Preferably, and not shown, there are two additional corresponding holding rods on the other side of the blade guard arrangement 8, not shown in FIG. 1-FIG. 4.

The cover part 11 is connected to the blade guard 12 such that it is moveable along a path between the first position and the second position, where the path mainly follows the circumference 17 such that a part of the blade guard 12 is radially positioned between the circumference 17 and the cover part 11, 11', 11" in the second position.

The holding rods 21, 22 are arranged such that the cover part 11 moves along said path, and in this example without any parts being attached at the center 16.

According to some aspects, with reference to FIG. 3 and FIG. 4, the swiveling cover part 11 is spring-biased towards the first position along at least a part of the path, the spring bias being accomplished by means of at least one spring element 33. The spring element 33 is attached to the blade guard 12 and a corresponding holding rod end 22a associated with the second holding rod 22. The holding rod end 22a is attached to the blade guard 12 by means of a pivot pin 13.

The spring element is biased such that the cover part 11 strives towards the first position along at least a part of the path; two different examples will be described in the following.

Figures 12A, 12B:
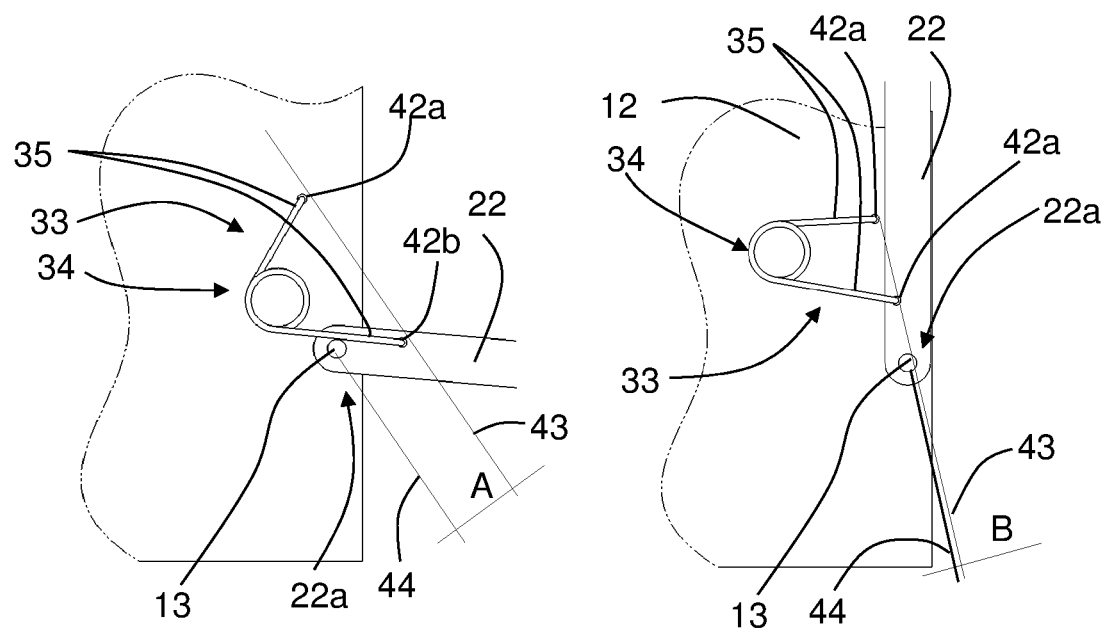
FIG. 12A shows a side view of a first type of spring element in one position.
FIG. 12B shows a side view of the spring element in another position.

With reference to FIG. 12A and FIG. 12B, according to some aspects, the spring element 33 has a winding part 34 and two arm parts 35, constituting a first type of spring element, which arm parts 35 are attached to the blade guard 12 and the corresponding holding means end 22a at corresponding arm attachments 42a, 42b. A first imaginary line 43 passing the arm attachments 42a, 42b never passes a second imaginary line 44, where the second line 44 is parallel to the first line 43 and runs via the pivot pin 13, such that the cover part 11 is spring-biased towards the first position along the path. In other words, as illustrated in FIG. 12A and FIG. 12B, a distance A, B between the lines 43, 44 always exceeds zero. This means that the cover part 11 always is spring-biased towards the first position.

With reference to FIG. 16, according to some aspects, the spring element 33 has a winding part 34 and two arm parts 35, being the first type of spring element, which arm parts 35 are attached to the blade guard 12 and the corresponding holding means end 22a at corresponding arm attachments 42a', 42b'. A first imaginary line 43' passing the arm attachments 42a', 42b' passes a second imaginary line 44' when brought to the second position, where the second line 44' is parallel to the first line 43' and runs via the pivot pin 13, such that the cover part 11 is spring-biased towards the second position along a part of the path. In other words, as illustrated in FIG. 16, a distance C between the lines 43', 44' changes sign. This means that the cover part 11 mainly is spring-biased towards the first position, but also is spring-biased towards the second position in the vicinity of the second position. This means that the cover part 11 can be set in the second position, but easily be brought back to the first position by moving it slightly away from the second position and then letting the spring force act.

Figure 13:
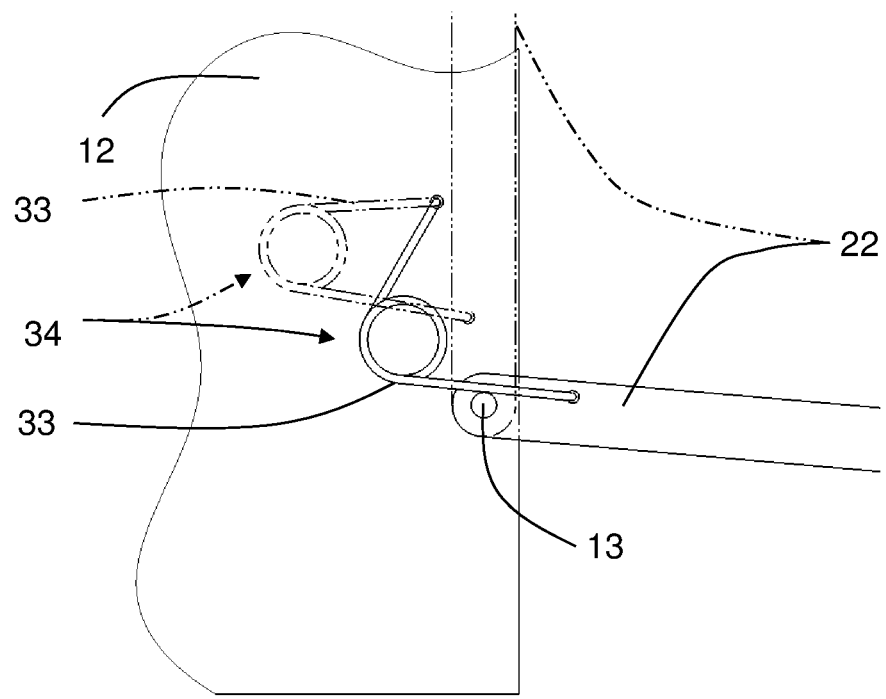
FIG. 13 shows a side view of the spring element in two positions.

With reference to FIG. 13, according to some aspects, the winding part 34 is adapted to move when the cover part 11 is moved between the first position and the second position such that the force of the spring bias is reduced the first position to the second position. An example of how the spring element 33 functions is also illustrated in FIG. 1-FIG. 4.

Figure 18:
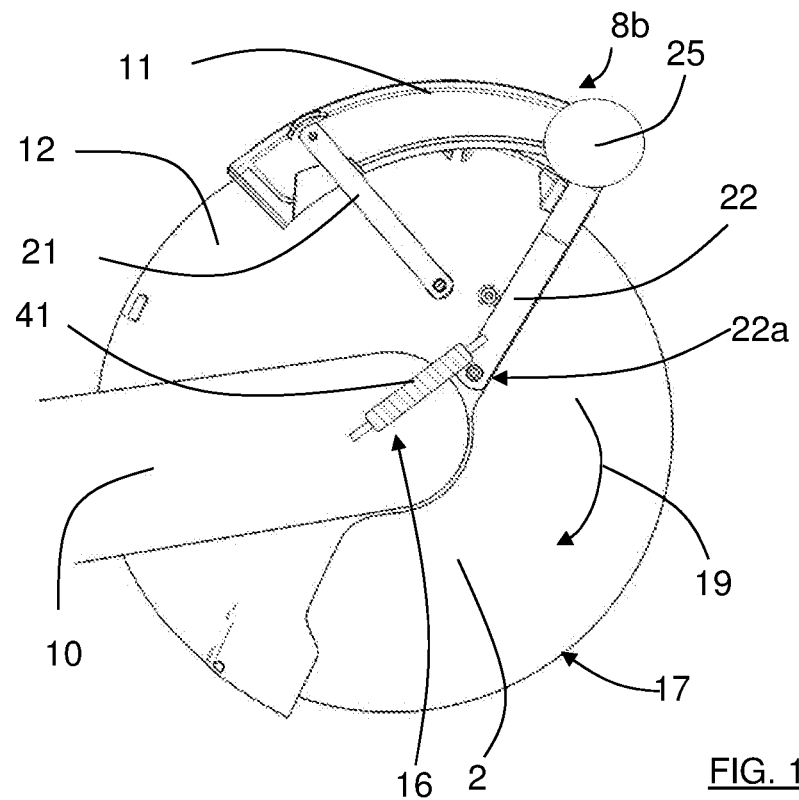
FIG. 18 shows a side view of a cutting disc and a blade guard arrangement with a protective arrangement being biased towards one position by means of the second type of spring element.
Figure 19:
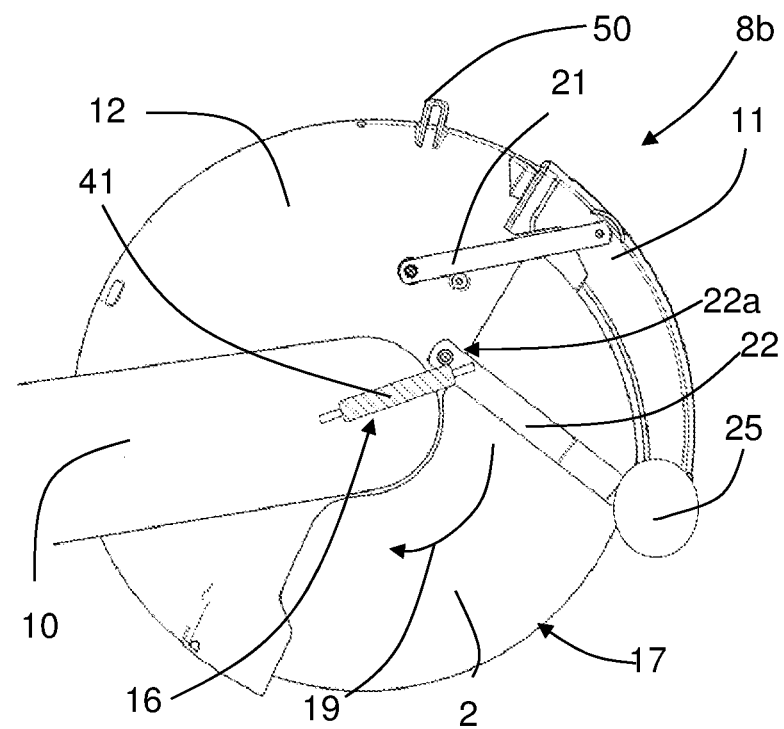
FIG. 19 shows a side view of a cutting disc and a blade guard arrangement with a protective arrangement being biased towards another position by means of the second type of spring element.

The spring element can of course have many other shapes and forms. With reference to FIG. 17A and FIG. 17B, according to some aspects, the spring element 41 comprises a spiral spring, constituting a second type of spring element, that is attached to the blade guard 12 and the corresponding holding means end 22a at corresponding spring attachments 45a, 45b. A first imaginary line 46 passing the spring attachments 45a, 45b passes a second imaginary line 47 when brought to the second position. The second line 47 is parallel to the first line 46 and runs via the pivot pin 13, such that the cover part 11 is spring-biased towards the second position along a part of the path. In other words, as illustrated in FIG. 17A and FIG. 17B, a distance D, E between the lines 46, 47 changes sign. This means that the cover part 11 mainly is spring-biased towards the first position, but also is spring-biased towards the second position in the vicinity of the second position. This means that the cover part 11 can be fixedly set in the second position, but easily be brought back to the first position by moving it slightly away from the second position and then letting the spring force act. This is illustrated in FIG. 18 and FIG. 19 which mainly correspond to FIG. 4 and FIG. 3. FIG. 18 and FIG. 19 are also used for illustrating a further example of the present disclosure as will be discussed later.

According to some aspects, for all the examples described above, there is arranged an additional corresponding spring element attached to an additional corresponding holding rod end on the other side of the blade guard arrangement 8, not shown in FIG. 1-FIG. 4, FIG. 12A, FIG. 12B, FIG. 13, FIG. 16, FIG. 17A, FIG. 17B, FIG. 18 and FIG. 19.

Figure 5:
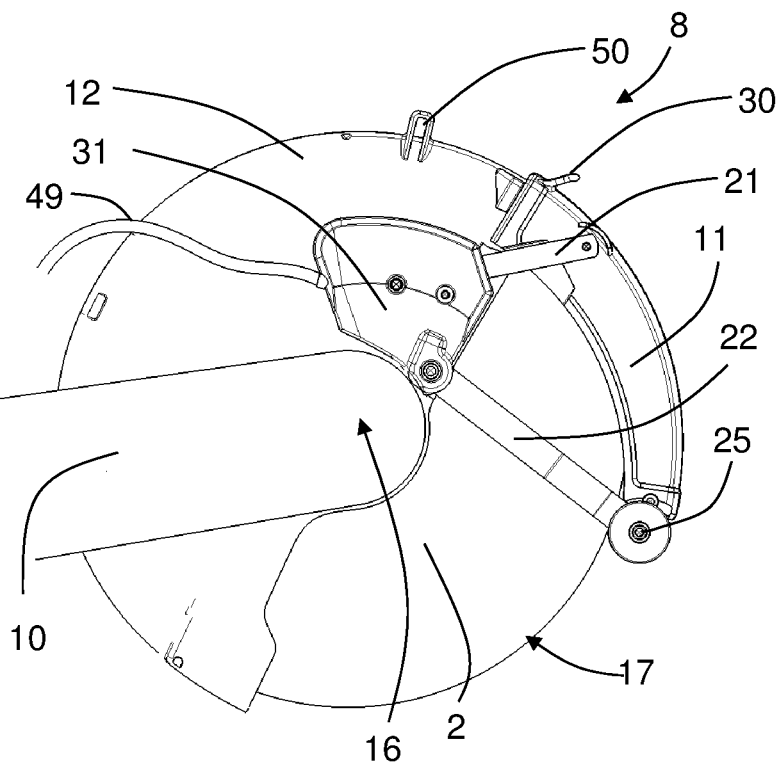
FIG. 5 shows a side view of a cutting disc and a blade guard arrangement with a protective arrangement according to the first example in the first position.

In FIG. 5 that corresponds to FIG. 3, another example is shown. Here, the spring element 33, 41 is covered by a covering plate 31. The covering plate is according to some aspects adapted to receive an incoming water supply hose 49, and thus also adapted to cover or comprise water dispensing means (not shown) adapted to dispense water that is intended to connect to dust that is released during cutting, preventing the dust to spread. There can be an additional covering plate on the other side of the blade guard arrangement as well, possibly adapted to cover or comprise water dispensing means, not shown in FIG. 5.

With renewed reference to FIG. 1 and FIG. 2, the second holding rod 22 also constitutes a continuously running delimiting contact part against which a work object 18 at least partly can rest during cutting of the work object 18. During cutting, the cover part 11 can move between the first position and the second position by means of pressure from the work object 18 against the contact part of the second holding rod 22, where this pressure works against the biasing. In this manner, the work object 18 will not be caught or stuck anywhere while pressing against the contact part and moving the cover part 11 between the first position and the second position. In order to further facilitate this, according to some aspects, the cover part 11 comprises a wheel 25 that is adapted to be in rotatable contact with a work object 18 during cutting. According to some aspects, an end portion of the second holding rod 22 comprises the wheel 25 that is adapted to be in rotatable contact with a work object 18 during cutting.

In the following, a number of examples for alternative attachments of the cover part 11 to the blade guard 12 will be described with reference to FIG. 6-FIG. 11.

Figure 6:
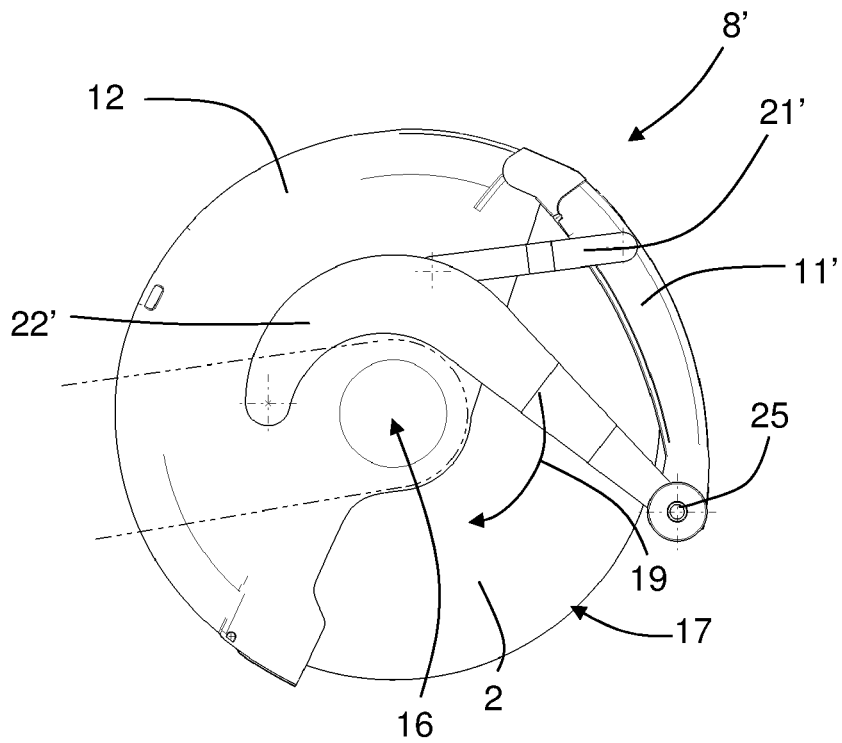
FIG. 6 shows a side view of a cutting disc and a blade guard arrangement with a protective arrangement according to a second example in the first position.
Figure 7:
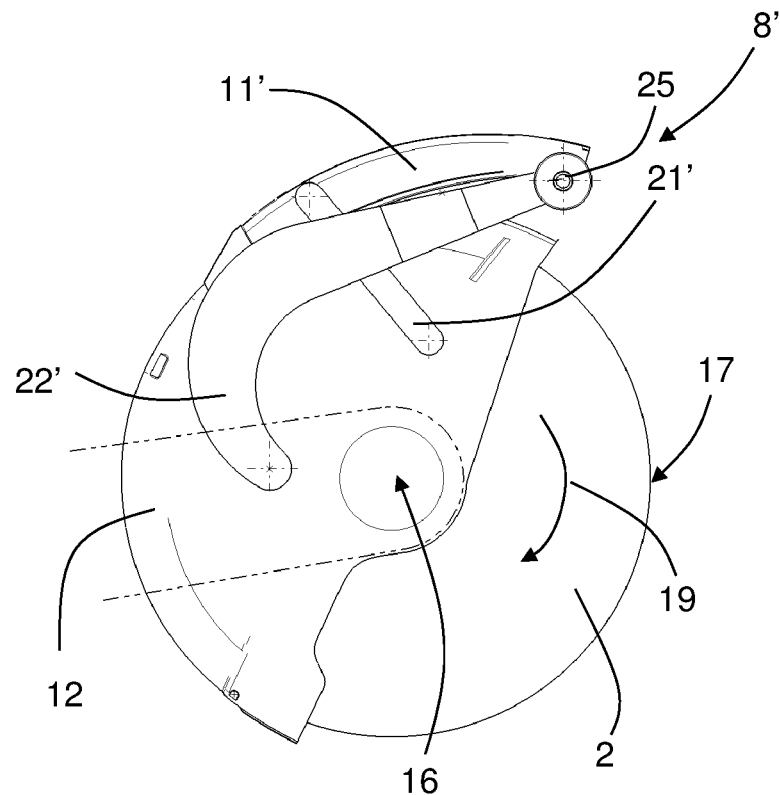
FIG. 7 shows a side view of a cutting disc and a blade guard arrangement with a protective arrangement according to the second example in the second position.

FIG. 6 shows a side view of a cutting disc 2 and a blade guard arrangement 8' with a protective arrangement according to a second example in the first position, and FIG. 7 shows a corresponding side view in the second position.

Here, there are two holding arms 21', 22' attaching the cover part 11' to the blade guard 12, where the holding arms 21', 22' are positioned at the same side of the blade guard arrangement 8. The holding means 21', 22' lie in different planes parallel to a planar extension of the cutting disc 2. This means that straight first holding arm 21' is sandwiched between an arcuate second holding arm 22' and the blade guard 12, where the second holding arm 22' in this example also constitutes a contact part according to the above, i.e. a continuously running delimiting contact part against which a work object 18 at least partly can rest during cutting of the work object 18.

According to some aspects, there are arranged additional holding arms corresponding to the holding arms 21', 22' on the other side of the blade guard arrangement 8', which holding arms are not showed in FIG. 6 and FIG. 7.

Figure 8:
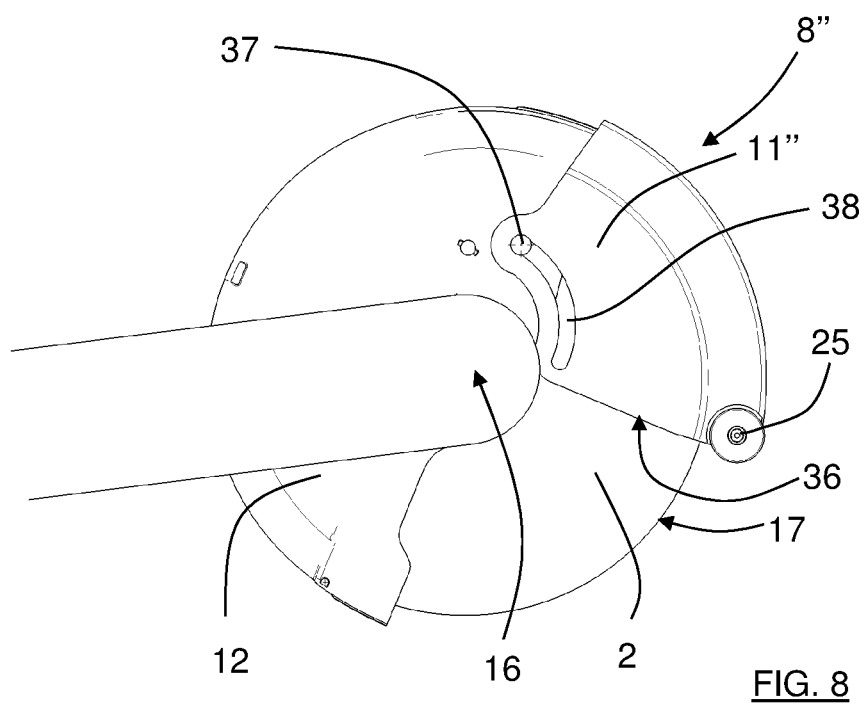
FIG. 8 shows a side view of a cutting disc and a blade guard arrangement with a protective arrangement according to a third example in the first position.
Figure 9:
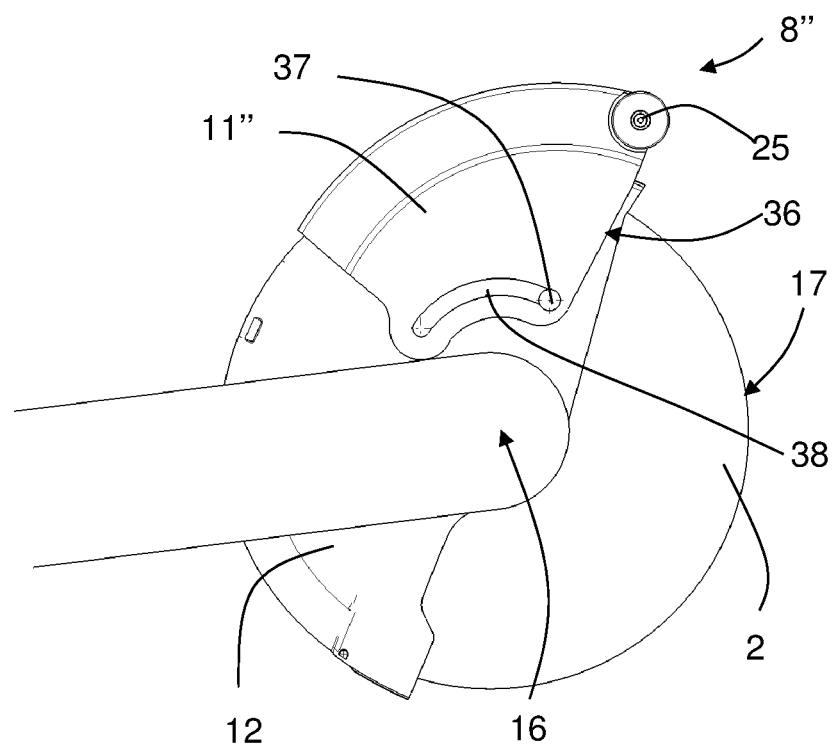
FIG. 9 shows a side view of a cutting disc and a blade guard arrangement with a protective arrangement according to the third example in the second position.

FIG. 8 shows a side view of a cutting disc 2 and a blade guard arrangement 8" with a protective arrangement according to a third example in the first position, and FIG. 9 shows a corresponding side view in the second position.

Here, the cover part 11" is attached to the blade guard 12" by means of a holding pin 37 comprised in the blade guard arrangement 8". The holding pin 37 is in the form of a guide attached to the blade guard 12" and is adapted to run in a corresponding arcuate slot 38 in the cover part 11". According to some aspects, there is an additional corresponding holding pin and slot on the other side of the blade guard arrangement 8", not shown in FIG. 8 and FIG. 9.

The cover part 11" has a somewhat pie-shaped structure in this example and comprises a front edge 36 that constitutes a contact part according to the above, i.e. a continuously running delimiting contact part against which a work object 18 at least partly can rest during cutting of the work object 18. The front edge 36 runs on both sides of the cutting disc 2.

Figure 10:
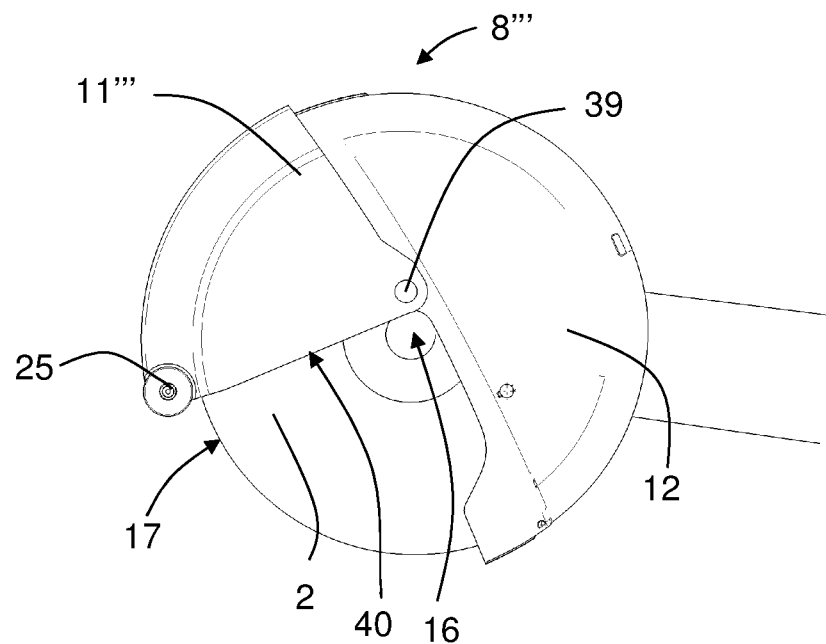
FIG. 10 shows a side view of a cutting disc and a blade guard arrangement with a protective arrangement according to a fourth example in the first position.
Figure 11:
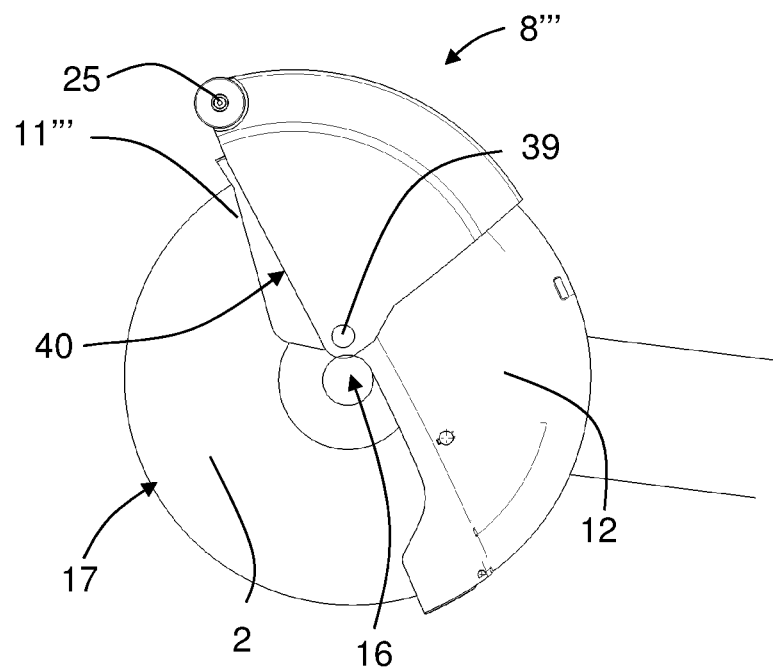
FIG. 11 shows a side view of a cutting disc and a blade guard arrangement with a protective arrangement according to the fourth example in the second position.

FIG. 10 shows a side view of a cutting disc 2 and a blade guard arrangement 8'" with a protective arrangement according to a fourth example in the first position, and FIG. 11 shows a corresponding side view in the second position.

Here, the cover part 11'" is attached to the blade guard 12'" by means of at least one pivot pin 39 that is comprised in the blade guard arrangement 8'" and is attached to the blade guard 12'", where cover part 11'" is adapted to pivot around the pivot pin 39. The pivot pin is slightly offset from the center 16. According to some aspects, there is an additional corresponding pivot pin on the other side of the blade guard arrangement 8'", not shown in FIG. 10 and FIG. 11.

According to some aspects, the examples described with reference to FIG. 8-11 can be combined such that the cover part 11" is attached to the blade guard 12" by means of a holding pin 37 comprised in the blade guard arrangement 8" and is adapted to run in a corresponding arcuate slot 38 in the cover part 11" on one side. On the other side, the cover part 11'" is attached to the blade guard 12'" by means of at least one pivot pin 39 that is comprised in the blade guard arrangement 8'" and is attached to the blade guard 12'", where cover part 11'" is adapted to pivot around the pivot pin 39.

The cover part 11'" that has a somewhat pie-shaped structure in this example and comprises a front edge 40 that constitutes a contact part according to the above, i.e. a continuously running delimiting contact part against which a work object 18 at least partly can rest during cutting of the work object 18. The front edge 40 runs on both sides of the cutting disc 2.

According to some aspects, for the examples discussed with reference to FIG. 6-FIG. 11, the cover part is spring biased by one or more spring elements; where applicable by means of spring elements similar to the ones as discussed previously.

According to some aspects, for the examples described, the cover part 11, 11', 11", 11'" comprises a handle 30 that admits a user to move the cover part 11 between the first position and the second position. Optionally, as only shown in FIG. 1, the blade guard 12 comprises a lock part 48 that is adapted for releasably locking the cover part 11 in the second position, the lock part 48 for example comprising a magnet. Alternatively, a spring-loaded member can be adapted to engage a locking member.

According to some aspects, for the examples described, the cover part 11, 11', 11", 11'" at least partly is made as a see-through structure. Such a structure can for example be a certain material such as clear plastics. Other alternatives for such a see-through structure are nets/grid structures or a material with see-through apertures or holes.

Figure 14:
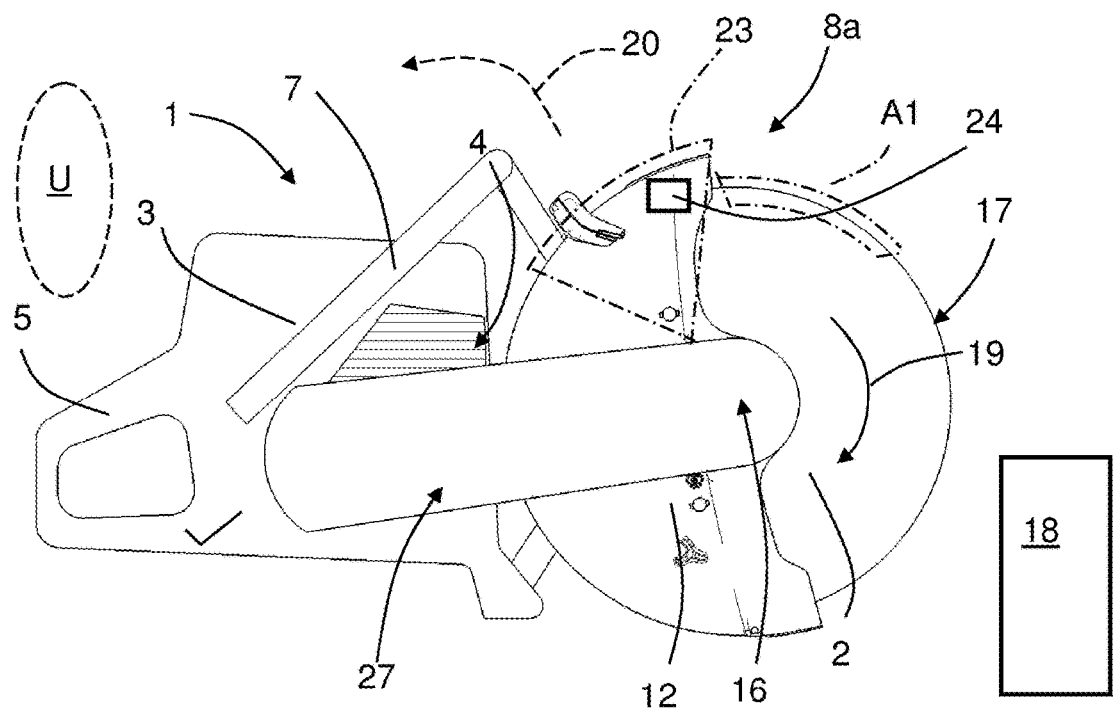
FIG. 14 shows a side view of a hand-held power cutter with a protective arrangement according to a fifth example in a normal position.
Figure 15:
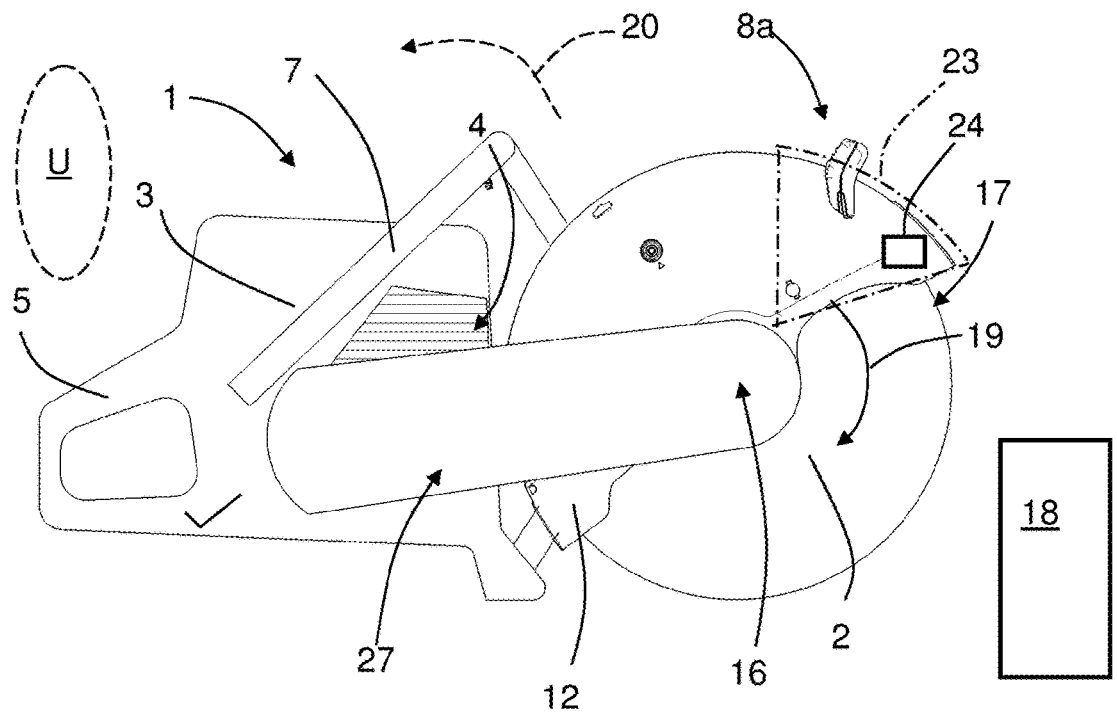
FIG. 15 shows a side view of a hand-held power cutter with a protective arrangement according to the fifth example in a displaced position.

In the following, an alternative protective arrangement will be described for the hand-held power cutter 1 with reference to FIG. 14 and FIG. 15, constituting a fifth example. The previously described second position is here a working position, as shown in FIG. 14, and the previously described first position is here a displaced position, as shown in FIG. 15.

The blade guard arrangement 8a comprises a blade guard 12 and a protective arrangement 23 that is adapted to be displaced from a working position, where the protective arrangement 23 admits normal cutting of a work object 18, to a displaced position such that the protective arrangement 23 in the displaced position at least partly becomes positioned such that a first arc A1 of a circle is adjacent to, or at least follows, the blade guard 12 and runs an angular distance along the circumference 17 after the blade guard 12 in the direction of rotation 19.

According to some aspects, the displacement is caused by the mass of the protective arrangement in combination with an acceleration, and can for example be initiated by means of a kick-back condition.

In this example, the blade guard 12 comprises a protective part 23 that constitutes the protective arrangement, where the blade guard 12 is adapted to rotate around the center 16 in the direction of rotation 19 should an acceleration according to the above occur. According to some aspects, the protective part 23 comprises a weight 24, and thus the blade guard 12 also comprises the weight 24.

The moveable blade guard can suitably be rotated in any direction around the center 16 by hand as well, and in that case by means of a handle 50.

For this alternative, the protective part can instead, or as a complement, comprise the cover part 11, 11', 11", 11'" as discussed previously, as illustrated for a blade guard arrangement 8b in FIG. 18 and FIG. 19. FIG. 18 shows side view of a cutting disc and a blade guard arrangement with a protective arrangement being biased towards the working position by means of the second type of spring element and FIG. 19 shows a corresponding side view with a protective arrangement being biased towards the displaced position by means of the second type of spring element.

This means that the swiveling cover part 11 is spring-biased by means of a spring element 41 that is attached to the blade guard 12 and a corresponding holding means end 22a, and where the holding means end 22a is attached to the blade guard 12 by means of a pivot pin 13. The spring element is biased such that the cover part 11 strives towards the working position along a part of the path and towards the displaced position along the rest of the path, where said part of the path is shorter than the rest of the path. This allows the cover part 11 to be held in the working position while working, and to be quickly displaced to the displaced position should an acceleration according to the above occur.

A biasing means as previously described with reference to FIG. 16 is also conceivable since it achieves this desired functionality.

Figure 20:
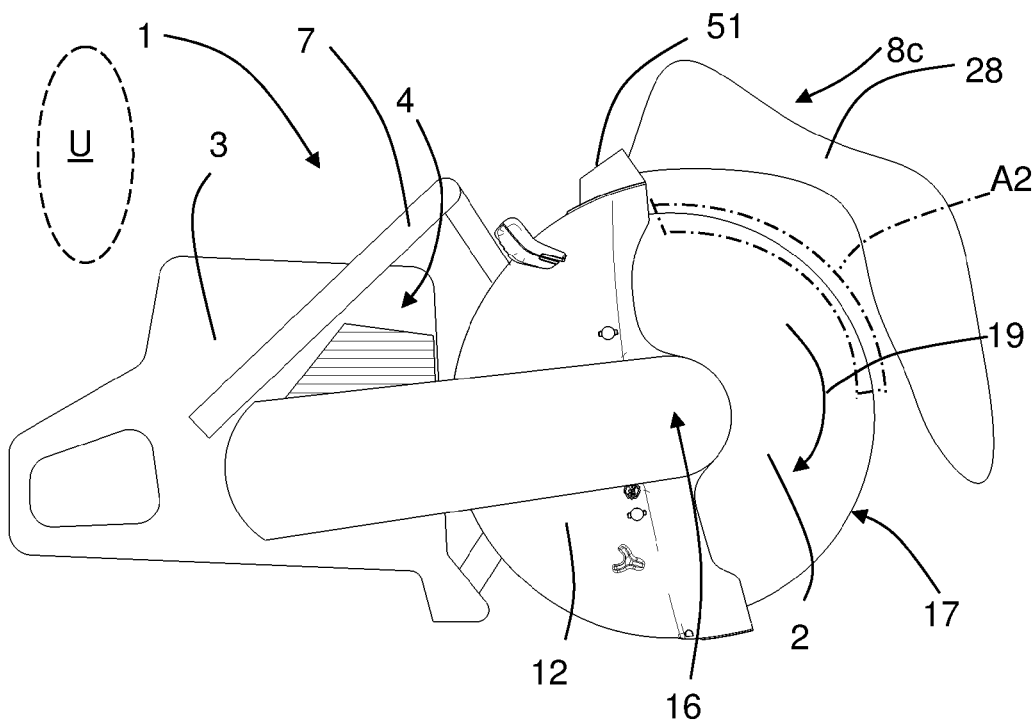
FIG. 20 shows a side view of a hand-held power cutter with a protective arrangement according to a sixth example in a displaced position.
Figure 21:
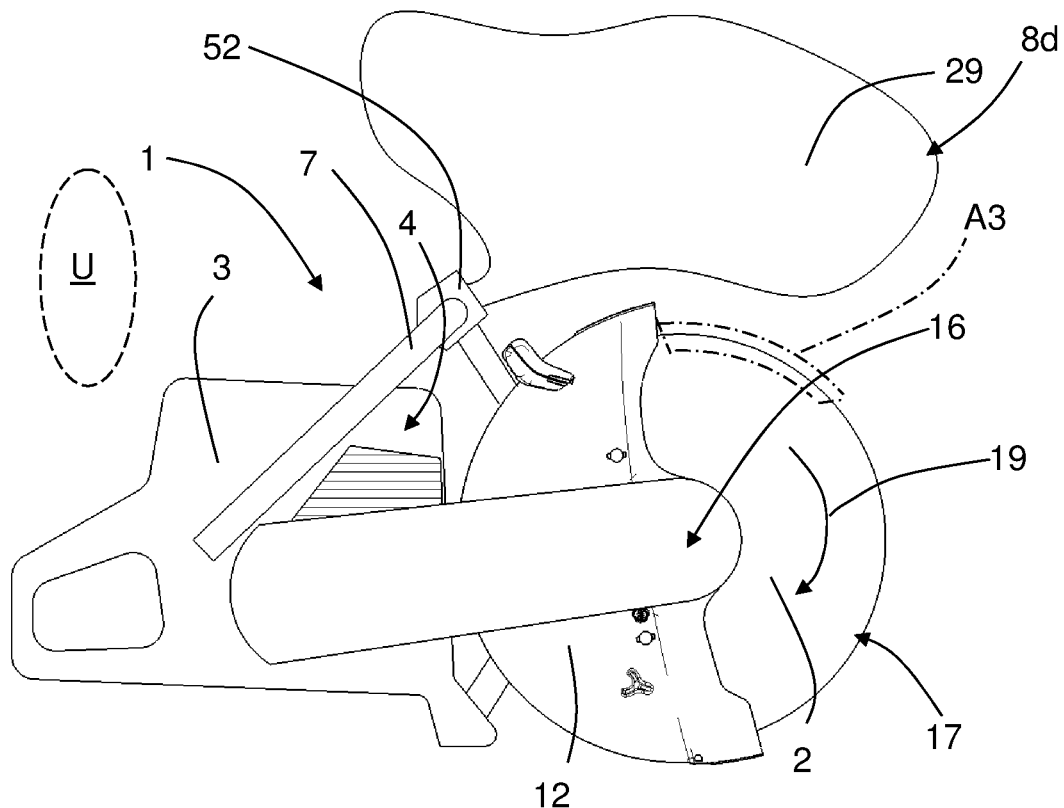
FIG. 21 shows a side view of a hand-held power cutter with a protective arrangement according to a seventh example in a displaced position.

Furthermore, with reference to FIG. 20 and FIG. 21, according to some aspects, the blade guard arrangement 8c, 8d comprises a protective arrangement that in turn comprises an airbag 29, 32 that is adapted to be inflated and expand to the displaced position.

In FIG. 20 there is a blade guard arrangement 8c that comprises an airbag generator 51 from which an airbag 28 has been deployed, covering a certain arc A2 of a circle. Here, the airbag 28 is intended as a protection as well as a brake, the airbag 28 being adapted to expand from the blade guard 12 and to partly be positioned between the circumference 17 and the blade guard 12 after inflation, such that the movement of the rotatable work tool 2 is reduced.

In FIG. 21, there is a blade guard arrangement 8d that comprises an airbag generator 52 from which an airbag 29 has been deployed, covering a certain arc A3 of a circle. Here, the airbag 29 is mainly intended as a protection.

In these alternative cases, the protective arrangement 11, 23, 28, 29 mostly covers a part of the blade guard 12 in the working position and is adapted to be displaced to the displaced position along a path mostly following the direction of rotation 19.

The present disclosure is not limited to the above examples, but may vary freely within the scope of the appended claims. For example, there can be any type of power cutter with a rotatable work tool such as a circular cutting disc, or a ring-shaped saw blade. Only some items of the power cutter in the example have been described, the power cutter in itself being of a well-known kind. The engine 4 can either be a combustion engine or an electric motor, as well as a hydraulic or pneumatic engine/motor.

For all the examples discussed, according to some aspects, the blade guard 12 is adapted to rotate around the center 16, and in particular in the direction of rotation 19, where the rotation is caused by the mass of the blade guard 12 in combination with an acceleration. For this purpose, according to some aspects, the blade guard 12 comprises a weight 24.

The rod parts, arm parts, holding pins and pivot pins described are all generally referred to as holding means. As described, there can be one or more holding means.

According to some aspects, the circumference 17 can be regarded as an imaginary circumference that follows an outer edge of the rotatable work tool 2. The blade guard arrangement 8 comprises a blade guard 12 that is adapted to partly cover said circumference 17.

The power cutter is generally constituted by a power tool comprising a rotatable work tool.

According to some aspects, the protective arrangement comprises a brake that is adapted to reduce the movement of the rotatable work tool 2 during certain conditions.

Generally, the present disclosure relates to a hand-held power tool 1 comprising a rotatable work tool 2 with a center 16 and a circumference 17 and being adapted to rotate in a certain direction of rotation 19, where the power tool 1 further comprises a blade guard arrangement 8 that is arranged to shield a variable part of the rotatable work tool 2. The blade guard arrangement 8 comprises a blade guard 12 and a swiveling cover part 11, 11', 11" that is attached to the blade guard 12 by means of at least one holding means 21, 22; 21', 22' comprised in the blade guard arrangement 8, and, in a first position, the swiveling cover part 11, 11', 11" is positioned such that a first arc A of a circle is covered, where the first arc A of a circle follows the blade guard 12, and runs an angular distance along the circumference 17 after the blade guard 12, in the direction of rotation 19, where the cover part 11 is moveable between the first position and a second position where a cutting operation of the rotatable work tool 2 along the first arc A of a circle is allowed, where the cover part 11, 11', 11" is biased in the direction of rotation 19, towards the first position by means of a biasing member.

Generally, the present disclosure also relates to a blade guard arrangement 8 that is arranged to shield a variable part of a rotatable work tool 2 for a hand-held power tool 1 along a circumference 17, where the blade guard arrangement 8 comprises a blade guard 12 that is adapted to partly cover said circumference 17. The blade guard arrangement 8 comprises a swiveling cover part 11, 11', 11" that is attached to the blade guard 12 by means of at least one holding means 21, 22; 21', 22' comprised in the blade guard arrangement 8, and, in a first position, is positioned such that a first arc A of a circle is covered, where the first arc A of a circle follows the blade guard 12, and runs an angular distance along the circumference 17 after the blade guard 12, in an intended direction of rotation 19 for the rotatable work tool 2, where the cover part 11 is moveable between the first position and a second position where a cutting operation of the rotatable work tool 2 along the first arc A of a circle is allowed, where the cover part 11, 11', 11" is biased in the direction of rotation 19, towards the first position by means of a biasing member.

According to some aspects, a second arc B of a circle is adjacent to the first arc A of a circle and runs an angular distance along the circumference 17 after the first arc A of a circle in the direction of rotation 19, where the second arc B of a circle is uncovered in the first position such that initial cutting is allowed along the second arc B of a circle.

According to some aspects, the blade guard arrangement 8, 8', 8", 8''' comprises a continuously running delimiting contact part 22, 36, 40 against which a work object 18 at least partly can rest during cutting of the work object 18, such that during cutting, the cover part 11, 11', 11", 11''' can move between the first position and the second position by means of pressure from the work object against said contact part 22, 36, 40, the pressure working against the biasing, where the contact part either is comprised in the cover part 11", 11''' or comprised in a part 22, 22' connecting the cover part 11, 11' to the blade guard 12.

According to some aspects, each holding means 21, 22; 21', 22' at its respective ends being pivotably attached to the swiveling cover part 11, 11' and the blade guard 12, and adapted to move relative the blade guard 12 when the cover part 11 is moved between the first position and the second position.

According to some aspects, there are two holding means 21, 22 at the same side of the blade guard arrangement 8, where the holding means lie 21, 22 in a common plane parallel to a planar extension of the rotatable work tool 2.

According to some aspects, there are two holding means 21', 22' at the same side of the blade guard arrangement 8, where the holding means 21', 22' lie in different planes parallel to a planar extension of the rotatable work tool 2.

According to some aspects, the cover part 11" is attached to the blade guard 12" by means of at least one holding means 37 comprised in the blade guard arrangement 8", each holding means 37 being in the form of a guide attached to the blade guard 12" and being adapted to run in a corresponding arcuate slot 38 in the cover part 11".

According to some aspects, the cover part 11''' is attached to the blade guard 12''' by means of at least one holding means 39 comprised in the blade guard arrangement 8''', each holding means 39 being in the form of a pivot pin attached to the blade guard 12''' where the cover part 11''' is adapted to pivot around the pivot pin 39.

According to some aspects, the cover part 11, 11', 11", 11''' is connected to the blade guard 12 such that it is moveable along a path between the first position and the second position, where the path mainly follows the circumference 17 such that a part of the blade guard 12 is radially positioned between the circumference 17 and the cover part 11, 11', 11", 11''' in the second position.

According to some aspects, the swiveling cover part 11, 11', 11" is spring-biased towards the first position along at least a part of the path, the spring bias being accomplished by means of at least one spring element 33, 41 that constitutes said biasing means.

According to some aspects, each spring element 33, 41 is attached to the blade guard 12 and a corresponding holding means end 22a and where the holding means end 22a is attached to the blade guard 12 by means of a pivot pin 13, the spring element being biased such that the cover part 11 strives towards the first position along at least a part of the path.

According to some aspects, the spring element 33 has a winding part 34 and two arm parts 35 which are attached to the blade guard 12 and the corresponding holding means end 22*a* at corresponding arm attachments 42*a*, 42*b*, where a first line 43 passing the arm attachments 42*a*, 42*b* never passes a second line 44, where the second line 44 is parallel to the first line 43 and runs via the pivot pin 13, such that the cover part 11 is spring-biased towards the first position along the path.

According to some aspects, the spring element 33 has a winding part 34 and two arm parts 35 which are attached to the blade guard 12 and the corresponding holding means end 22*a* at corresponding arm attachments 42*a'*, 42*b'*, where a first line 43' passing the arm attachments 42*a'*, 42*b'* passes a second line 44' when brought to the second position, where the second line 44' is parallel to the first line 43' and runs via the pivot pin 13, such that the cover part 11 is spring-biased towards the second position along a part of the path.

According to some aspects, the winding part 34 is adapted to move when the cover part 11 is moved between the first position and the second position such that the force needed to move the cover part 11, 11', 11" is reduced from the first position to the second position.

According to some aspects, the spring element 41 comprises a spiral spring that is attached to the blade guard 12 and the corresponding holding means end 22*a* at corresponding spring attachments 45*a*, 45*b*, where a first line 46 passing the spring attachments 45*a*, 45*b* passes a second line 47 when brought to the second position, where the second line 47 is parallel to the first line 46 and runs via the pivot pin 13, such that the cover part 11 is spring-biased towards the second position along a part of the path.

According to some aspects, the cover part 11 comprises a handle 30 that admits a user to move the cover part 11 between the first position and the second position.

According to some aspects, the blade guard 12 comprises a lock part 48 that is adapted for releasably locking the cover part 11 in the second position.

According to some aspects, the blade guard 12 is adapted to rotate in the direction of rotation 19, where the rotation is caused by the mass of the blade guard 12 in combination with an acceleration.

According to some aspects, the blade guard 12 comprises a weight 24.

According to some aspects, the cover part 11 comprises a wheel 25 that is adapted to be in rotatable contact with a work object 18 during cutting.

According to some aspects, the cover part 11 at least partly is made as a see-through structure.

Generally, the present disclosure also relates to a hand-held power tool 1 comprising a rotatable work tool 2 having a center 16 and a circumference 17 and being adapted to rotate in a certain direction of rotation 19, where the power tool 1 further comprises a blade guard arrangement 8, 8*a*, 8*b*, 8*c*, 8*d* that at least partly is arranged to shield a part of the rotatable work tool 2. The blade guard arrangement 8 comprises a blade guard 12 and a protective arrangement 11, 23, 28, 29 that is adapted to be displaced from a working position, where the protective arrangement 11, 23, 28, 29 admits normal cutting of a work object 18, to a displaced position such that the protective arrangement 11, 23, 28, 29 in the displaced position at least partly becomes positioned such that a first arc A1, A2, A3 of a circle is covered, where the first arc A1, A2, A3 of a circle follows the blade guard 12, and runs an angular distance along the circumference 17 after the blade guard 12, in the direction of rotation 19.

Generally, the present disclosure also relates to a blade guard arrangement 8 that is arranged to shield a variable part of a rotatable work tool 2 for a hand-held power tool 1 along a circumference 17, where the blade guard arrangement 8 comprises a blade guard 12 that is adapted to partly cover said circumference 17. The blade guard arrangement 8 comprises a protective arrangement 11, 23, 28, 29 that is adapted to be displaced from a working position, where the protective arrangement 11, 23, 28, 29 is adapted to admit normal cutting of a work object 18, to a displaced position such that the protective arrangement 11, 23, 28, 29 in the displaced position at least partly becomes positioned such that a first arc A1, A2, A3 of a circle is covered, where the first arc A1, A2, A3 of a circle follows the blade guard 12, and runs an angular distance along the circumference 17 after the blade guard 12, in an intended direction of rotation 19 for the rotatable work tool 2, According to some aspects, the displacement is caused by the mass of the protective arrangement in combination with an acceleration.

According to some aspects, the blade guard 12 comprises a protective part 23 that constitutes the protective arrangement, where the blade guard 12 is adapted to rotate around the center 16 in the direction of rotation 19.

According to some aspects, the protective part 23 comprises a weight 24.

According to some aspects, the protective arrangement 11, 23, 28, 29 mostly covers a part of the blade guard 12 in the working position and is adapted to be displaced to the displaced position along a path mostly following the direction of rotation 19.

According to some aspects, the protective arrangement a swiveling cover part 11, 11', 11" that is attached to the blade guard 12 by means of at least one holding means 21, 22; 21', 22' comprised in the blade guard arrangement 8, 8*b*, wherein each holding means 21, 22; 21', 22' at its respective ends being pivotably attached to the swiveling cover part 11, 11' and the blade guard 12, and adapted to move relative the blade guard 12 when the cover part 11 is moved between the first position and the second position.

According to some aspects, there are two holding means 21, 22 at the same side of the blade guard arrangement 8, where the holding means lie 21, 22 in a common plane parallel to a planar extension of the rotatable work tool 2.

According to some aspects, there are two holding means 21', 22' at the same side of the blade guard arrangement 8, where the holding means 21', 22' lie in different planes parallel to a planar extension of the rotatable work tool 2.

According to some aspects, the cover part 11" is attached to the blade guard 12" by means of at least one holding means 37 comprised in the blade guard arrangement 8", each holding means 37 being in the form of a guide attached to the blade guard 12" and being adapted to run in a corresponding arcuate slot 38 in the cover part 11".

According to some aspects, the cover part 11''' is attached to the blade guard 12''' by means of at least one holding means 39 comprised in the blade guard arrangement 8''', each holding means 39 being in the form of a pivot pin attached to the blade guard 12''' where the cover part 11''' is adapted to pivot around the pivot pin 39.

According to some aspects, the cover part 11, 11', 11", 11''' is connected to the blade guard 12 such that it is moveable along a path between the first position and the second position, where the path mainly follows the circumference 17 such that a part of the blade guard 12 is radially positioned between the circumference 17 and the cover part 11, 11', 11" in the second position.

According to some aspects, the swiveling cover part 11 is spring-biased by means of at least one spring element 33, 41, where each spring element 33, 41 is attached to the blade guard 12 and a corresponding holding means end 22a and where the holding means end 22a is attached to the blade guard 12 by means of a pivot pin 13, the spring element 33, 41 being biased such that the cover part 11 strives towards the working position along a part of the path and towards the displaced position along the rest of the path.

According to some aspects, the spring element 33 has a winding part 34 and two arm parts 35 which are attached to the blade guard 12 and the corresponding holding means end 22a at corresponding arm attachments 42a', 42b', where a first line 43' passing the arm attachments 42a', 42b' passes a second line 44' when brought to the working position, where the second line 44' is parallel to the first line 43' and runs via the pivot pin 13.

According to some aspects, the winding part 34 is adapted to move when the cover part 11 is moved between the working position and the displaced position such that the force needed to move the cover part 11 is reduced from the working position to the displaced position.

According to some aspects, the spring element 41 comprises a spiral spring that is attached to the blade guard 12 and the corresponding holding means end 22a at corresponding spring attachments 45a, 45b, where a first line 46 passing the spring attachments 45a, 45b passes a second line 47 when brought to the displaced position, where the second line 47 is parallel to the first line 46 and runs via the pivot pin 13.

According to some aspects, the protective arrangement comprises an airbag 28, 29 that is adapted to be inflated and expand to the displaced position.

According to some aspects, the airbag 28 is adapted expand from the blade guard 12 and to partly be positioned between the circumference 17 and the blade guard 12 after inflation, such that the movement of the rotatable work tool 2 is reduced.

The invention claimed is:

1. A hand-held power tool comprising:
   a rotatable work tool having a center and a circumference and being adapted to rotate in a certain direction of rotation; and
   a blade guard arrangement that at least partly is arranged to shield a part of the rotatable work tool,
   wherein the blade guard arrangement comprises a blade guard and a protective arrangement,
   wherein the protective arrangement is adapted to be displaced along a path from a working position, in which the protective arrangement admits cutting of a work object, to a displaced position such that in the displaced position, the protective arrangement at least partly becomes positioned such that a first part of the circumference is covered,
   wherein the first part of the circumference follows the blade guard, and runs an angular distance along the circumference after the blade guard, in the direction of rotation,
   wherein the protective arrangement is biased into both the working position and the displaced position based on where along the path the protective arrangement is disposed,
   wherein the protective arrangement is biased into both the working position and the displaced position by a spring, and
   wherein the spring is configured such that, responsive to the hand-held power tool experiencing a kick-back condition, the protective arrangement overcomes a bias of the spring to enable the protective arrangement to move from the working position to the displaced position.

2. The hand-held power tool according to claim 1, wherein the protective arrangement is displaced by the mass of the protective arrangement in combination with an acceleration.

3. The hand-held power tool according to claim 1, wherein the protective arrangement of the blade guard arrangement comprises a protective part, wherein the blade guard is adapted to rotate around the center in the direction of rotation.

4. The hand-held power tool according to claim 3, wherein the protective part comprises a weight.

5. The hand-held power tool according to claim 1, wherein the protective arrangement mostly covers a part of the blade guard in the working position and is adapted to be displaced to the displaced position along the path mostly following the direction of rotation.

6. The hand-held power tool according to claim 1, wherein the protective arrangement is a swiveling cover part that is attached to the blade guard by at least one holding means comprised in the blade guard arrangement, wherein each holding means of the at least one holding means, at respective ends thereof, is pivotably attached to the swiveling cover part and the blade guard, and adapted to move relative the blade guard when the cover part is moved between the working position and the displaced position.

7. The hand-held power tool according to claim 6, wherein the at least one holding means comprises two holding means at a first side of the blade guard arrangement, wherein the holding means lie in a common plane parallel to a planar extension of the rotatable work tool.

8. The hand-held power tool according to claim 6, wherein the at least one holding means comprises two holding means at a first side of the blade guard arrangement, where the holding means lie in different planes parallel to a planar extension of the rotatable work tool.

9. The hand-held power tool according to claim 6, wherein the swiveling cover part is connected to the blade guard such that the swiveling cover part is moveable along the path between the working position and the displaced position, wherein the path mainly follows the circumference such that a part of the blade guard is radially positioned between the circumference and the swiveling cover part in the working position.

10. The hand-held power tool according to claim 9, wherein the spring is attached to the blade guard and to a corresponding holding means of the at least one holding means and wherein the corresponding holding means of the at least one holding means is attached to the blade guard by means of a pivot pin.

11. The hand-held power tool according to claim 10, wherein the spring has a winding part and two arm parts which are attached to the blade guard and to the corresponding holding means of the at least one holding means at corresponding arm attachments, wherein a first line passing the arm attachments passes a second line when brought to the working position, wherein the second line is parallel to the first line and runs via the pivot pin.

12. The hand-held power tool according to claim 11, wherein the winding part is adapted to move when the cover part is moved between the working position and the displaced position such that the force needed to move the cover part is reduced from the working position to the displaced position.

13. The hand-held power tool according to claim 10, wherein the spring comprises a spiral spring that is attached to the blade guard and the corresponding holding means of the at least one holding means at corresponding spring attachments, wherein a first line passing the spring attachments passes a second line when brought to the displaced position, wherein the second line is parallel to the first line and runs via the pivot pin.

14. The hand-held power tool according to claim 1, wherein the protective arrangement is attached to the blade guard by at least one holding means comprised in the blade guard arrangement, each holding means of the at least one holding means being in the form of a guide attached to the blade guard and being adapted to run in a corresponding arcuate slot in the protective arrangement.

15. The hand-held power tool according to claim 1, wherein the protective arrangement is attached to the blade guard by at least one holding means comprised in the blade guard arrangement, each holding means of the at least one holding means being in the form of a pivot pin attached to the blade guard wherein the protective arrangement is adapted to pivot around the pivot pin.

16. A blade guard arrangement that is arranged to shield a variable part of a rotatable work tool for a hand-held power tool along a circumference of the rotatable work tool,
wherein the blade guard arrangement comprises a blade guard that is adapted to partly cover said circumference,
wherein the blade guard arrangement comprises a protective arrangement that is adapted to be displaced along a path from a working position, in which the protective arrangement is adapted to admit cutting of a work object at a first part of the circumference, to a displaced position such that in the displaced position, the protective arrangement at least partly becomes positioned such that the first part of the circumference is covered,
wherein the first part of the circumference follows the blade guard, and runs an angular distance along the circumference after the blade guard, in an intended direction of rotation for the rotatable work tool,
wherein the protective arrangement is biased into both the working position and the displaced position based on where along the path the protective arrangement is disposed,
wherein the protective arrangement is biased into both the working position and the displaced position by a spring, and
wherein the spring is configured such that, responsive to the hand-held power tool experiencing a kick-back condition, the protective arrangement overcomes a bias of the spring to enable the protective arrangement to move from the working position to the displaced position.

* * * * *